United States Patent
Settelmayer et al.

(10) Patent No.: US 7,611,035 B2
(45) Date of Patent: Nov. 3, 2009

(54) HITCH SKI CARRIER

(75) Inventors: Joseph J. Settelmayer, Fieldbrook, CA (US); Timothy C. Smith, McKinleyville, CA (US); Addie Segura, legal representative, McKinleyville, CA (US)

(73) Assignee: Yakima Products, Inc., Beaverton, OR (US)

( * ) Notice: Subject to any disclaimer, the term of this patent is extended or adjusted under 35 U.S.C. 154(b) by 299 days.

(21) Appl. No.: 11/327,163

(22) Filed: Jan. 5, 2006
(Under 37 CFR 1.47)

(65) Prior Publication Data
US 2006/0237504 A1 Oct. 26, 2006

Related U.S. Application Data

(60) Provisional application No. 60/641,981, filed on Jan. 5, 2005.

(51) Int. Cl.
*B60R 9/00* (2006.01)
*A47F 7/00* (2006.01)

(52) U.S. Cl. ........................ 224/519; 224/522; 224/523; 224/525; 224/531; 224/532; 224/533; 211/70.5

(58) Field of Classification Search ............... 224/519, 224/522, 523, 524, 525, 529, 530, 531, 532, 224/533, 917, 917.5; 211/70.5
See application file for complete search history.

(56) References Cited

U.S. PATENT DOCUMENTS

| 3,018,897 | A | * | 1/1962 | Carlyle | ........................ 211/70.5 |
| 3,209,970 | A | * | 10/1965 | Canell | ........................ 224/319 |
| 4,518,108 | A | * | 5/1985 | Allen | ........................ 224/314 |
| D292,567 | S | * | 11/1987 | Douglas | .................... D12/408 |
| 4,997,116 | A | * | 3/1991 | Grim | .......................... 224/493 |
| 5,330,312 | A | * | 7/1994 | Allsop et al. | ................. 414/462 |
| D351,885 | S | * | 10/1994 | Gonthier | ...................... D3/259 |
| 5,752,638 | A | * | 5/1998 | Meeks | ........................ 224/547 |
| D434,717 | S | * | 12/2000 | McCoy et al. | ............... D12/406 |
| 6,336,580 | B1 | * | 1/2002 | Allen et al. | .................. 224/532 |
| 6,644,525 | B1 | * | 11/2003 | Allen et al. | .................. 224/497 |
| 6,655,562 | B2 | * | 12/2003 | Jeong | ........................ 224/282 |
| 7,322,499 | B2 | * | 1/2008 | Storer | ........................ 224/405 |

FOREIGN PATENT DOCUMENTS

JP 2005153667 A * 6/2005

\* cited by examiner

*Primary Examiner*—Nathan J Newhouse
*Assistant Examiner*—Lester L Vanterpool
(74) *Attorney, Agent, or Firm*—Kolisch Hartwell, P.C.

(57) ABSTRACT

A rack assembly for carrying skis or snowboards is configured for mounting on a hitch rack behind the vehicle. The ski or snowboard rack assembly includes a pair of U-shaped bar members connected by clamp devices that appear in a preferred design, the clamp devices are connected to the bar members via brackets that permit rotation of the bar members within the brackets, thus providing collapsibility for storage.

16 Claims, 5 Drawing Sheets

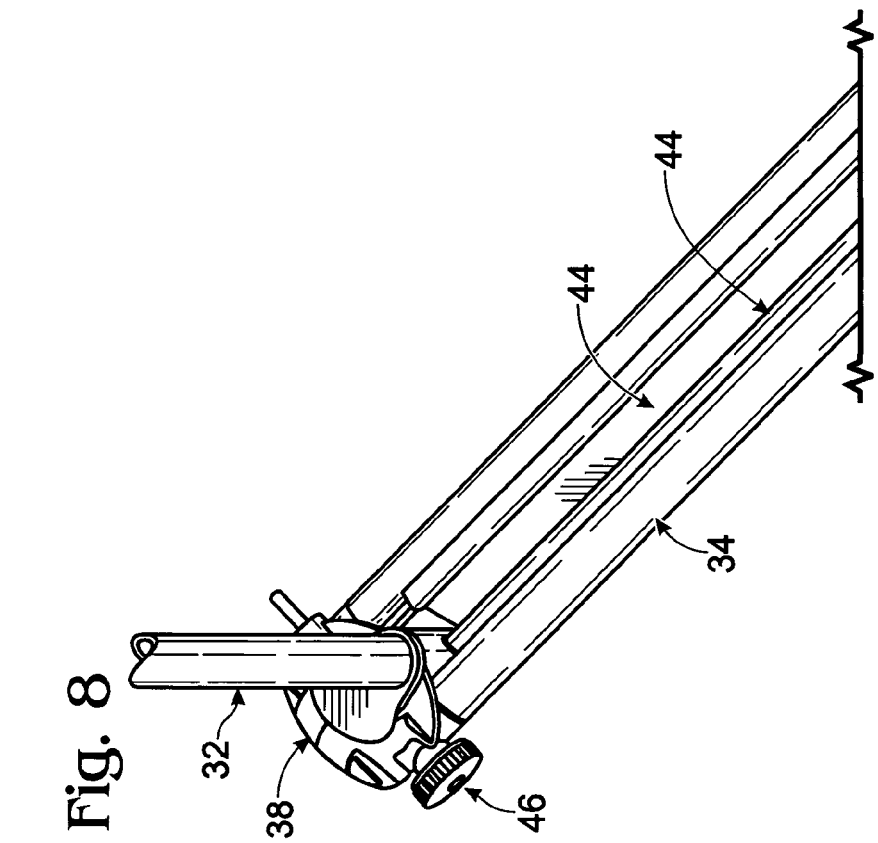
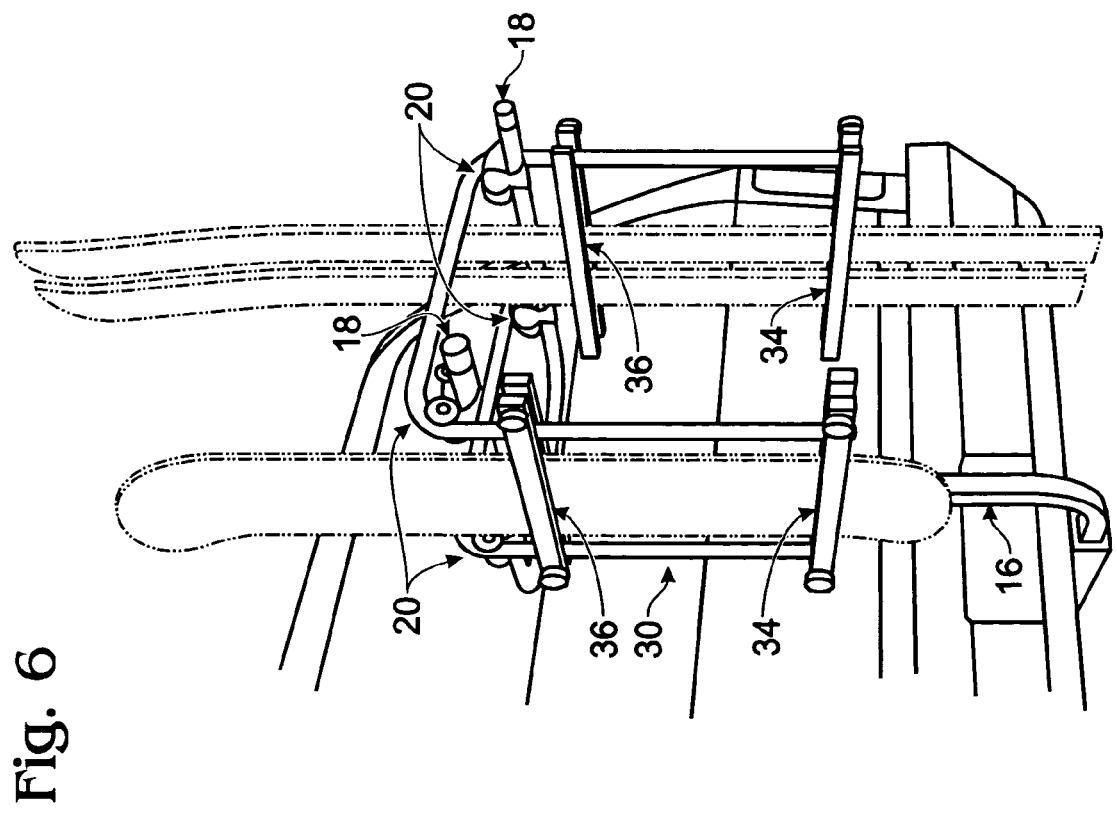

US 7,611,035 B2

HITCH SKI CARRIER

CROSS-REFERENCES

This application claims priority under 35 U.S.C. § 119 and applicable foreign and international law of the following U.S. provisional patent application, which is hereby incorporated by reference in its entirety for all purposes: Ser. No. 60/641,981, filed Jan. 5, 2005.

This application also incorporates by reference in their entirety for all purposes the following U.S. patents: U.S. Pat. No. 5,094,373, issued Mar. 10, 1992; No. 5,664,717, issued Sep. 9, 1997; and No. 6,467,664, issued Oct. 22, 2002.

FIELD OF THE INVENTION

The present invention is related to a ski rack. More specifically, the present invention is related to an adjustable ski rack that secures skis and/or snowboards to the outside of a vehicle.

BACKGROUND

Vehicle carrier racks are typically mounted on the exterior of a motor vehicle to support bicycles, skis, surf boards, and the like, above the ground. These racks are generally constructed of rigid frame members having arms extending horizontally therefrom for supporting objects. Various types of carrier racks are available that may be mounted either to the roof, to the trunk, or to the rear hitch of the vehicle.

One type of rack, generally used for carrying one or more bicycles adjacent to the rear of a vehicle, is mountable on the rear hitch of the vehicle. These hitch mounted bicycle racks include a hitch coupling member adapted to securely attach to the rear hitch of the vehicle. An elongated and generally upright mast extends upward from the coupling member adjacent the rear of the vehicle. Two load-carrying support members extend outward and rearward from the upper end of the mast. The support members may be configured to retain the top tube of the bicycle. Further, the support members typically include a securing mechanism adapted to fasten the bike tube to the support members of the rack.

Skis are also commonly transported on vehicle rack carriers. By carrying skis exterior to a vehicle, a vehicle user does not reduce interior cargo space. Ski racks may be affixed to the roof of a vehicle or to the rear of a vehicle. Commonly, skis and snowboards are secured to a ski rack by clamping mechanisms, which utilize opposing rails with rubber cushions that clamp down on the skis and snowboards. These clamping mechanisms may be configured in an open configuration for loading and unloading skis and snowboards, or a closed configuration for securely holding the skis and snowboards during transport.

One type of ski rack functions as an attachment to upright hitch mounted bicycle racks. Prior to use, these ski rack attachments are typically positioned on top of the support members of the hitch mounted bicycle rack, which acts as a cradle for the ski rack. The ski rack attachment is then fastened to the bicycle rack with the bicycle rack's securing mechanism. Generally, ski rack attachments are configured to secure several sets of skis and snowboards to the rear of a vehicle in a parallel, upright position on either side of the bicycle rack's support members. The skis and snowboards are held in place on the ski rack attachment by vertically arranged pairs of clamping mechanisms.

SUMMARY OF THE INVENTION

Rack assemblies for carrying skis or snowboards behind a vehicle include U-shaped bar members connected by clamp devices. In one example, the clamp devices are connected to the bar members via brackets that permit rotation of the bar members within the brackets to provide collapsibility for storage. In another example, the clamp devices include an adjustment mechanism for varying the gaps in the clamp to accommodate skis or snowboards of various thicknesses.

BRIEF DESCRIPTION OF THE FIGURES

FIG. 6 is a perspective view of a ski or snowboard rack carrying skis and snowboards.

FIGS. 7-9 are partial perspective views of an adjustment device used to vary a gap in the clamping device for securing skis or snowboards of various thicknesses.

DETAILED DESCRIPTION

Figure 1:
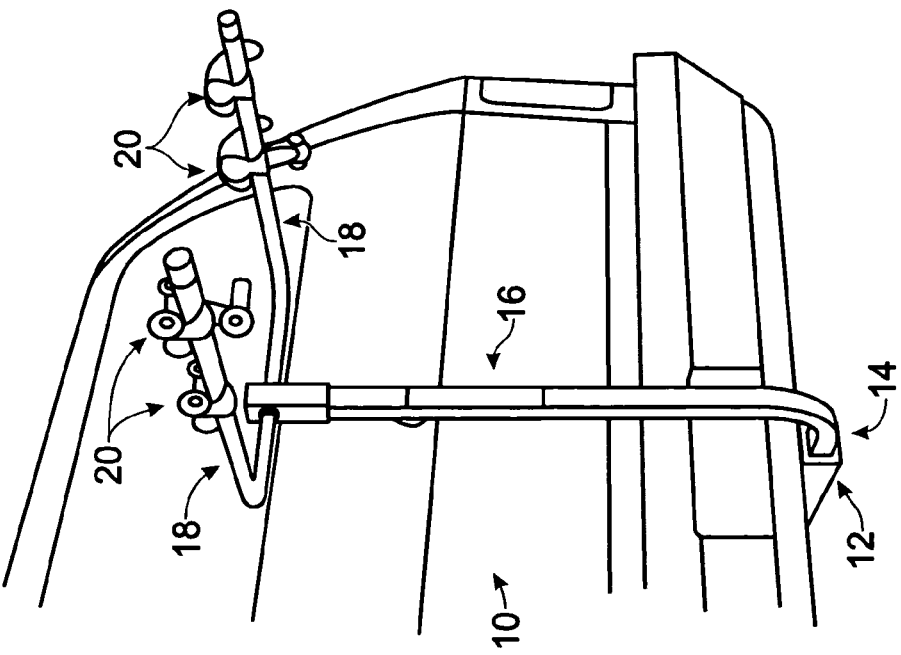
FIG. 1 is a perspective view of a hitch rack for carrying cargo behind a vehicle.

FIG. 1 shows a hitch mounted bicycle rack 10, mounted on the rear hitch 12 of a vehicle, for carrying one or more bicycles adjacent to the rear of a vehicle. Hitch mounted bicycle rack 10 includes a hitch coupling member 14 adapted to securely attach to rear hitch 12 of the vehicle. An elongated and generally upright mast 16 extends upward from coupling member 14 adjacent the rear of the vehicle. Two load-carrying support members 18 extend outward and rearward from the upper end of mast 16. Support members 18 may be configured to retain the top tube of a bicycle. Support members 18 typically include securing mechanisms 20 adapted to fasten the bike tube to support members 18 of rack 10.

Figure 2:
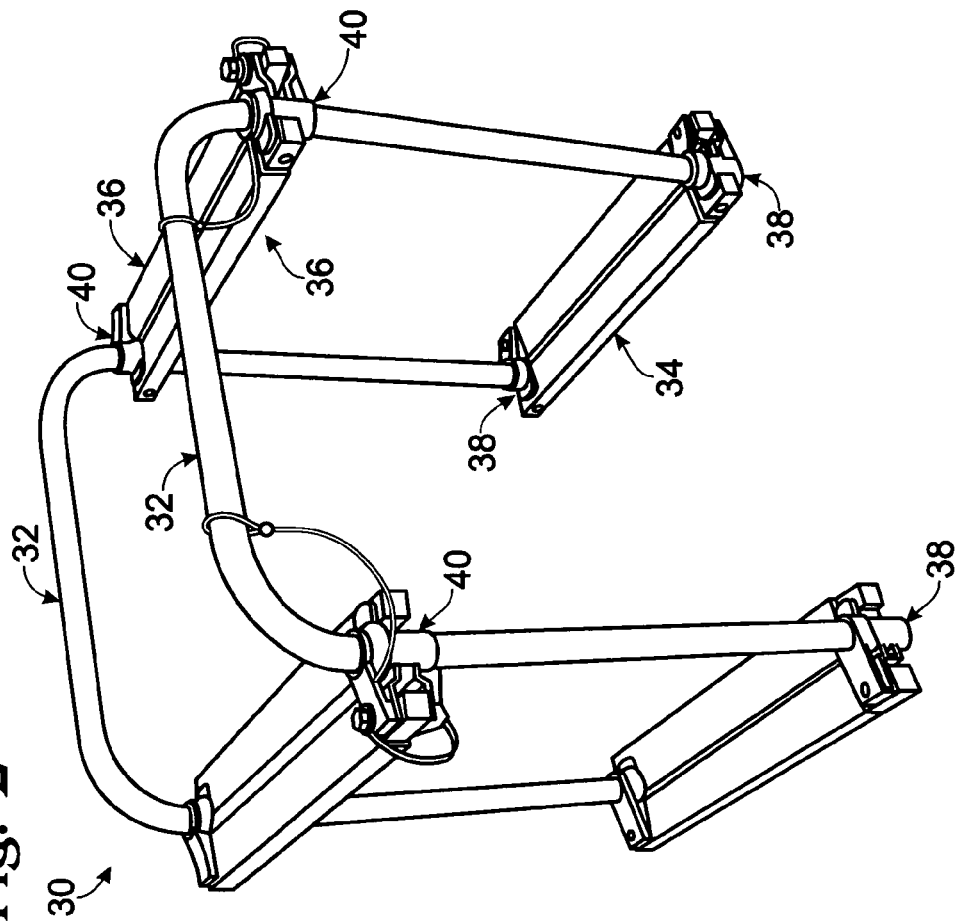
FIG. 2 is a perspective view of a ski or snowboard rack configured to be carried on a hitch rack such as the one shown in FIG. 1.

FIGS. 2-6 show a ski rack attachment 30 configured to adapt a hitch mounted bicycle rack into a hitch mounted ski rack. FIG. 2 shows a perspective view of ski rack attachment 30 in an open parallelepiped configuration. Ski rack attachment 30 may be generally shaped like an upside down U, with two rigid parallel U-frames 32 connected by two perpendicular lower clamping mechanisms 34 and two perpendicular upper clamping mechanisms 36 connecting each of the vertical sides of the U-frames. Lower clamping mechanisms 34 are attached to U-frames 32 by lower joint brackets 38, and upper clamping mechanisms 36 are attached to U-frames 32 by upper joint brackets 40.

Figure 3:
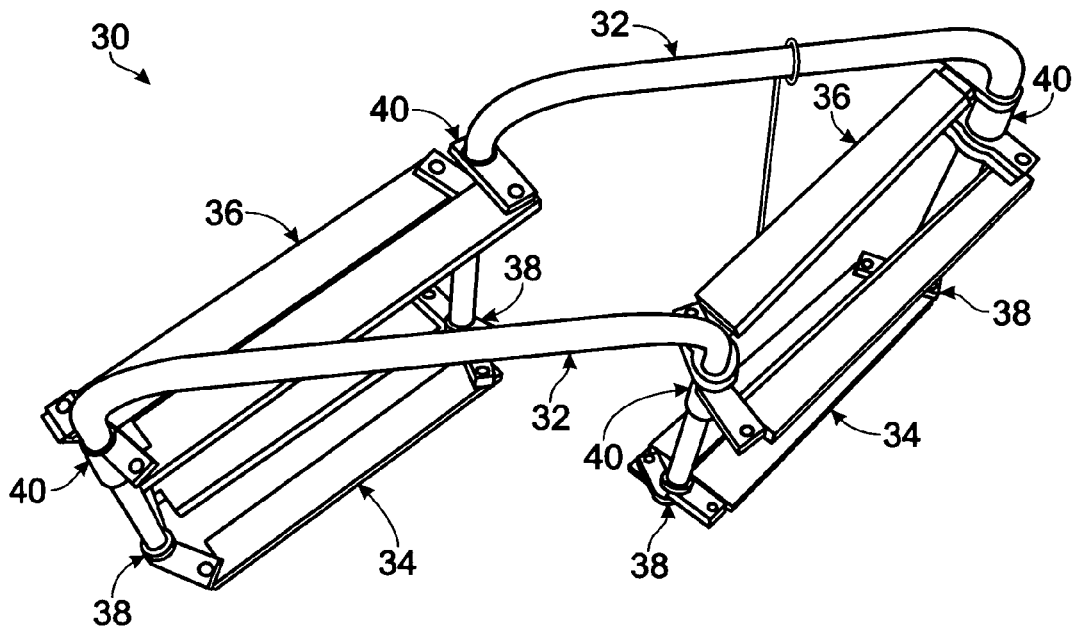
FIG. 3 is a top view of the rack shown in FIG. 2 partially collapsed.

Joint brackets 38 and 40 may be affixed to the U-frames 32 and the upper and lower clamping mechanisms 34 and 36 by using a fastening bolt that rigidly holds the ski rack attachment in an open parallelepiped conformation, such as that shown in FIG. 2. Alternatively, joint brackets 38 and 40 may be rigidly affixed to the upper and lower clamping mechanisms but may be rotatable around the long axis of U-frames 32 so that the ski rack attachment 30 may be configured in either an open parallelepiped configuration (as shown in FIG. 2) or a collapsed parallelogram configuration. FIG. 3 shows a top view of ski rack attachment 30 in a partially collapsed parallelogram configuration attained by rotating the joint brackets 38 and 40 clockwise around the long axis of U-frames 32.

Figure 4:
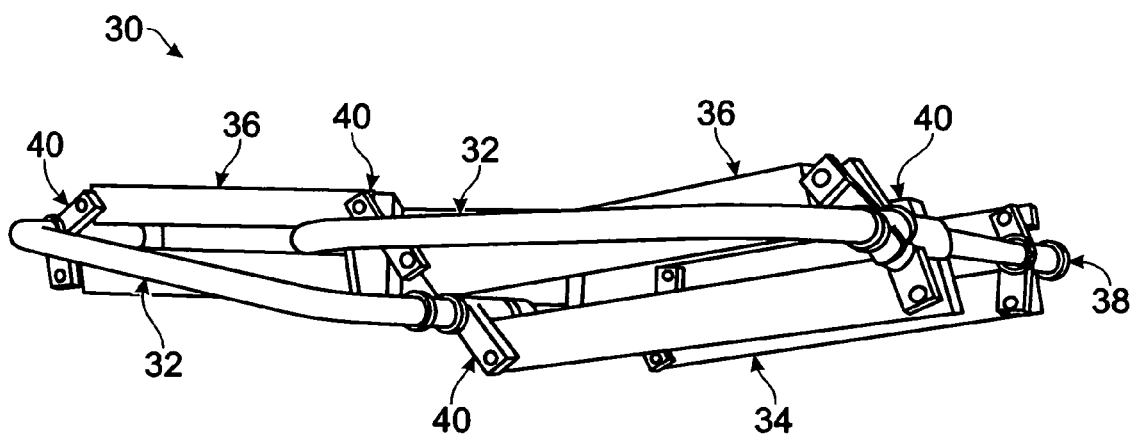
FIG. 4 is a top view of the rack shown in FIGS. 2 and 3 fully collapsed.

FIG. 4 shows a top view of ski rack attachment 30 in a completely collapsed parallelogram configuration attained by rotating joint brackets 38 and 40 clockwise around U-frames 32 until the ski rack attachment 30 is substantially planar. Joint brackets 38 and 40 may be configured to have a locking mechanism that engages with U-frames 30 to retain the ski rack attachment 30 in an open configuration or a collapsed configuration as desired.

Figure 5:
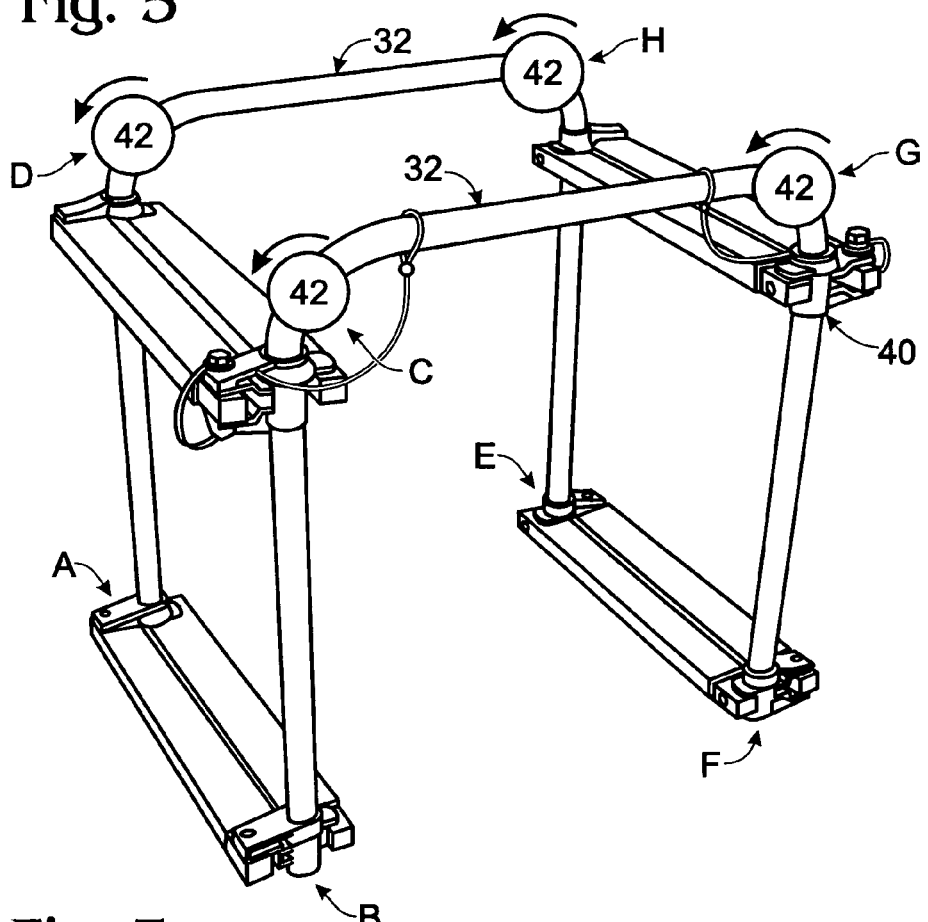
FIG. 5 is a perspective view of an alternate embodiment of a rack for carrying skis or snowboards.

FIG. 5 shows an alternative collapsible ski rack attachment that is configured with joints 42 at the bend in U-frames 32. As shown in FIG. 5, three rectangular sides may be defined by configuring ski rack attachment 30 in an open configuration. Side 1 is defined by points A, B, C and D. Side 2 is defined by points E, F, G, and H. Side 3 is defined by points C, D, H and G. Joints 42 may use hinge mechanisms to permit folding of sides 1 and 2 toward side 3 so that the three sides are substantially stacked and/or parallel. Side 1 may be rotated at joints 42 along the path of the curved arrows until side 1 lies flat along the bottom of side 3. Likewise, side 2 may be rotated at joints 42 along the path of the curved arrows until side 2 lies flat along the top of side 3. The ski rack attachment 30 would thus be collapsed into a compact form.

Prior to use as a ski rack, ski rack attachment 30 may be configured in an open fixed parallelepiped configuration. As shown in FIG. 6, ski rack attachment 30 is positioned on top of support members 18 of a hitch mounted bicycle rack, which acts as a cradle for ski rack attachment 30. Ski rack attachment 30 is then fastened in place by securing mechanisms 20, which alternatively may function to secure a top tube of a bike. Generally, ski rack attachments are configured to secure several sets of skis and snowboards to a vehicle. For example, as shown in FIG. 6, upper and lower clamps 34 and 36 secure skis and snowboards in a parallel, upright position on either side of support members 18.

Figure 7:
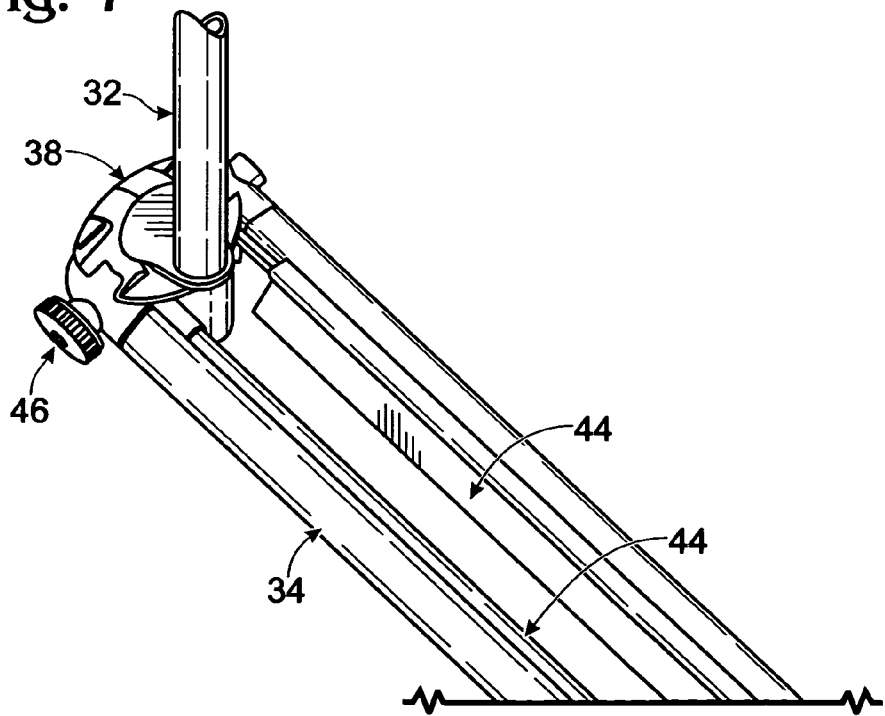
Figure 9:
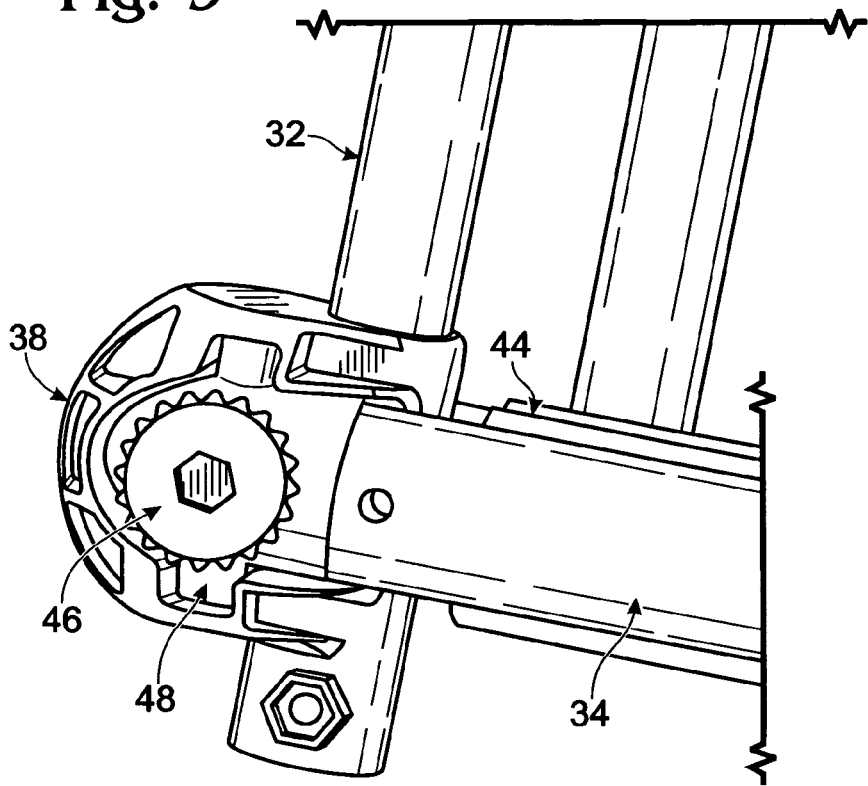

FIGS. 7-9 show an adjustable clamping mechanism for securing skis and snowboards of varying width to ski racks and ski rack attachments. Lower clamping mechanism 34 is attached to U-frame 32 by lower joint bracket 38. Clamping mechanism 34 has rubber cushions 44 that clamp down on skis and snowboards to secure them to the ski rack. The width of the opening between rubber cushions 44 is adjustable to accommodate skis and snowboards of varying thickness. Unscrewing adjustment knob 46 of joint bracket 38 allows a user to adjust the distance between rubber cushions 44 of clamping mechanism 34. For example, in FIG. 7 the clamping mechanism 34 has been adjusted to accommodate a thicker load. In FIG. 8, the clamping mechanism 34 has been adjusted to accommodate a thinner load than in FIG. 7.

As shown in FIG. 9, lugs 48 are seated in channels molded into joint bracket 38. When adjustment knob 46 is unscrewed, the lugs 48 may freely slide in and out of channels molded into joint bracket 38 to adjust the width between the two rubber cushions 44 of clamping mechanism 34. Further, internal compression springs (not shown) may be positioned within joint bracket 38. When adjustment knob 46 is unscrewed, these internal compression springs may provide some outward force that facilitates sliding lug 48 outward, thereby expanding the width between the two rubber cushions 44 of clamping mechanism 34.

Figure 10:
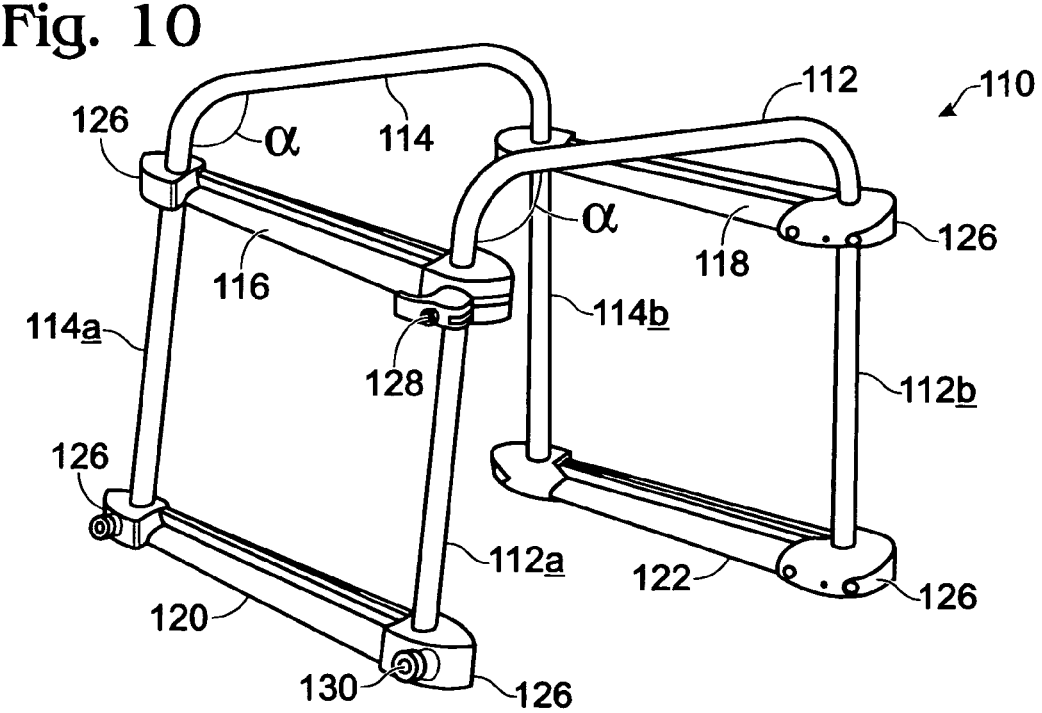
FIG. 10 is a perspective view of another example of a ski or snowboard rack configured for mounting on a hitch rack behind a vehicle.

FIG. 10 shows another example of a ski or snowboard rack configured for mounting on a hitch rack behind a vehicle. Ski or snowboard rack 110 includes two U-shaped bar members 112 and 114. Bar member 112 has two leg portions 112a and 112b. Bar member 114 has two leg portions 114a and 114b. Bar members 112 and 114 are connected by upper clamp devices 116 and 118, as well as lower clamp devices 120 and 122. Clamp devices 116, 118, 120, and 122 connect bar members 112 and 114 via brackets 126 that permit rotation of bar members 112 and 114 within their respective brackets. This design permits collapsing of rack assembly 110 into a position substantially as shown in FIG. 4. Alternatively, bolts may be used through the bar members to secure brackets 126. Latch device 128 is provided for opening upper clamp device 116 when loading or removing skis or snowboards from rack assembly 110. Latch 128 may use, for example, a cam lever on a post that pivots away from bracket 128 allowing upper clamp device 116 to pivot open. A similar latch (not shown) is provided on upper clamp device 118. Adjustment mechanisms 130 are provided for varying the gaps in the clamp devices to accommodate skis or snowboards of various thicknesses. In a preferred design, a threaded knob is spring biased open. When loading skis or snowboards, a person may open the gap, then tighten it after loading the skis or snowboards. Bar members 112 and 114 have angles a greater than 90-degrees, preferably about 100-degree so that skis and snowboards do not fall back when loading.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A rack for carrying skis or snowboards behind a vehicle comprising
   a hitch mounting device configured to mount in a female receiving member on the back of a vehicle,
   a mast rigidly attached to the hitch mounting device oriented substantially vertically,
   at least two arms connected to the mast, each arm having a support portion extending rearward relative to the vehicle substantially perpendicular to the mast, and a securing device for temporarily cradling and securing a substantially horizontal bar of a bicycle or a ski rack,
   a ski rack assembly configured for mounting on the securing devices on the support portions of the arms, including first and second rigid U-shaped bar members, each bar member having a first leg connected to a center piece connected to a second leg, the first legs of the first and second bar members being connected by a first set of upper and lower clamp devices, the second legs of the first and second bar members being connected by a second set of upper and lower clamp devices, each clamp device having a gap for receiving skis or snowboards, wherein each of the upper and lower clamp devices is connected to respective legs of the bar members by brackets that permit rotation of the brackets around axes parallel to the legs, allowing the rack assembly to be collapsed toward a substantially coplanar storage position.

2. The rack of claim 1, wherein each of the upper clamp devices can be opened to facilitate loading and unloading of skis or snowboards.

3. The rack of claim 1, wherein the gaps in the clamp members are adjustable to fit skis or snowboards of different thicknesses.

4. The rack of claim 1, wherein the legs of the bar members have a circular cross section.

5. The rack of claim 1, wherein the mast is connected to the hitch mounting device via a swing-away device permitting the mast and ams to pivot away from a rear door of the vehicle.

6. The rack of claim 1, wherein each securing device includes a cradle and a strap for holding the center piece of a bar member in the cradle.

7. The rack of claim 1, where each upper clamp device has a latch mechanism for maintaining the clamp device in a closed position.

8. The rack of claim 1, wherein the ski rack assembly has two sides for carrying skis or snowboards, at least one clamp device on each side of the ski rack assembly having a lock for preventing unauthorized removal of skis or snowboards carried on the rack assembly.

9. A rack device for carrying skis or snow boards behind a vehicle comprising
a ski rack assembly configured for mounting on support arms of a vehicle hitch rack, the ski assembly including first and second rigid U-shaped bar members, each bar member having a first leg connected to a center piece connected to a second leg, the first legs of the first and second bar members being connected by a first set of upper and lower clamp devices, the second legs of the first and second bar members being connected by a second set of upper and lower clamp devices, each clamp device having a gap for receiving skis or snowboards, wherein each of the upper and lower clamp devices is connected to respective legs of the bar members by brackets that permit rotation of the brackets around axes parallel to the legs, allowing the rack assembly to be collapsed toward a substantially coplanar storage position.

10. The rack of claim 9, wherein each of the upper clamp devices can be opened to facilitate loading and unloading of skis or snowboards.

11. The rack of claim 9, wherein the gaps in the clamp members are adjustable to fit skis or snowboards of different thicknesses.

12. The rack of claim 9, wherein the legs of the bar members have a circular cross section.

13. The rack of claim 9, where each upper clamp device has a latch mechanism for maintaining the clamp device in a closed position.

14. The rack of claim 9, wherein the ski rack assembly has two sides for carrying skis or snowboards, at least one clamp device on each side of the ski rack assembly having a lock for preventing unauthorized removal of skis or snowboards carried on the rack assembly.

15. The rack of claim 9, wherein the ski rack assembly has two sides for carrying skis or snowboards, at least one clamp device on each side of the ski rack assembly having a lock for preventing unauthorized removal of skis or snowboards carried on the rack assembly.

16. A rack device for carrying skis or snow boards behind a vehicle comprising
a ski rack assembly configured for mounting on support arms of a vehicle hitch rack, the ski assembly including first and second rigid U-shaped bar members, each bar member having a first leg connected to a center piece connected to a second leg, the first legs of the first and second bar members being connected by a first set of upper and lower clamp devices, the second legs of the first and second bar members being connected by a second set of upper and lower clamp devices, each clamp device having a pair of end brackets gripping respective legs of the first and second bar members, and opposing cushions between the brackets defining a gap, for receiving skis or snowboards, wherein each leg forms an angle greater than 90-degrees with the respective centerpiece of a bar member.

* * * * *